US006351696B1

(12) United States Patent
Krasny et al.

(10) Patent No.: US 6,351,696 B1
(45) Date of Patent: Feb. 26, 2002

(54) AUTOMATIC LEVELING SYSTEM FOR ARTICULATED BOOM

(75) Inventors: Alexander Krasny, Eagan, MN (US); William F. Burch, Long Beach, CA (US)

(73) Assignee: Schwing America, Inc., White Bear Lake, MN (US)

( * ) Notice: Subject to any disclaimer, the term of this patent is extended or adjusted under 35 U.S.C. 154(b) by 0 days.

(21) Appl. No.: 09/393,637

(22) Filed: Sep. 10, 1999

(51) Int. Cl.$^7$ .................................................. B60S 9/00
(52) U.S. Cl. ....................... 701/50; 701/124; 280/6.153
(58) Field of Search ................ 701/50, 124; 280/6.153; 254/423

(56) References Cited

U.S. PATENT DOCUMENTS 4,619,369 A * 10/1986 Mertens ...................... 212/304
4,913,458 A * 4/1990 Hamilton .................... 280/6.1
5,143,386 A * 9/1992 Uriarte ....................... 280/6.1
5,159,989 A * 11/1992 Claxton ....................... 180/41
5,580,095 A * 12/1996 Fukumoto ................... 280/840
6,050,573 A * 4/2000 Kunz ...................... 280/6.153

FOREIGN PATENT DOCUMENTS

JP 10-36079 * 2/1998

* cited by examiner

*Primary Examiner*—Michael J. Zanelli
(74) *Attorney, Agent, or Firm*—Kinney & Lange, P.A.

(57) ABSTRACT

An automatic leveling system for a vehicle supporting an articulable boom system. The automatic leveling system uses a microprocessor to monitor various inputs indicative of the current position of the vehicle and generates electrical drive signals to control the amount of extension of various outriggers extending from the vehicle.

24 Claims, 4 Drawing Sheets

10
y
62
y'
66
23r
23l
20
12
Ø
Ø
x
64
60
22r
22l
68
x'
28

AUTOMATIC LEVELING SYSTEM FOR ARTICULATED BOOM

CROSS-REFERENCE TO RELATED APPLICATION(S)

None.

BACKGROUND OF THE INVENTION

The present invention relates to a device for leveling a base of a boom and conveying pipeline of a fire truck. More particularly, it relates to a device for deploying outriggers and extending them an appropriate distance such that the boom and pipeline is gravitationally level.

One type of fire-fighting device utilizes an articulable boom and conveying pipeline to manipulate the dispensing point of a quenching agent strategically with respect to the source of a fire. An example of such a fire-fighting system is disclosed in U.S. patent application Ser. No. 09/393,464 filed Sep. 10, 1999 by Burch, et al. entitled "Fire-fighting System Having Improved Flow," which is assigned to Schwing America, Inc., the assignee of the present application and is hereby incorporated by reference. Concrete pumping trucks also often operate using an articulable boom for placement of the concrete dispensing point. For safe operation of these types devices, it is important that the vehicle be level. More specifically, the turret or base supporting the maneuverable booms must be gravitationally level. If the turret is not gravitationally level, the boom sections may experience slew (i.e., rotation about a vertical axis) and may undesirably move into an unsafe position or cause damage to the boom or conveying pipeline.

Systems known in the prior art performed gravitational leveling of the turret by manually adjusting the position and force supplied by the outriggers extending from the fire truck. This method, however, was difficult and inefficient as it required an operator to manually move to the site of the outrigger and adjust its position and then return to the fire truck to check level. Manual leveling is an iterative process that can be difficult and time consuming. There is a need in the art for an automatic leveling system for leveling the base of a boom of a fire-fighting vehicle to ensure safe operation.

BRIEF SUMMARY OF THE INVENTION

An automatic leveling system for a vehicle used to support an articulable boom and pipeline is disclosed. The automatic leveling system includes outriggers extending out from the vehicle and having a foot that is vertically adjustable with respect to the vehicle. It also includes components for individually adjusting the vertical position of the feet. A tilt sensor is used to sense the position of the vehicle with respect to gravitational level along two coplanar orthogonal axis. A microprocessor is used for receiving signals and calculating the slope of the vehicle with respect to level. The microprocessor also generates a drive signal to drive the components for individually adjusting the vertical position of the feet to level the vehicle.

DETAILED DESCRIPTION

Figure 1:
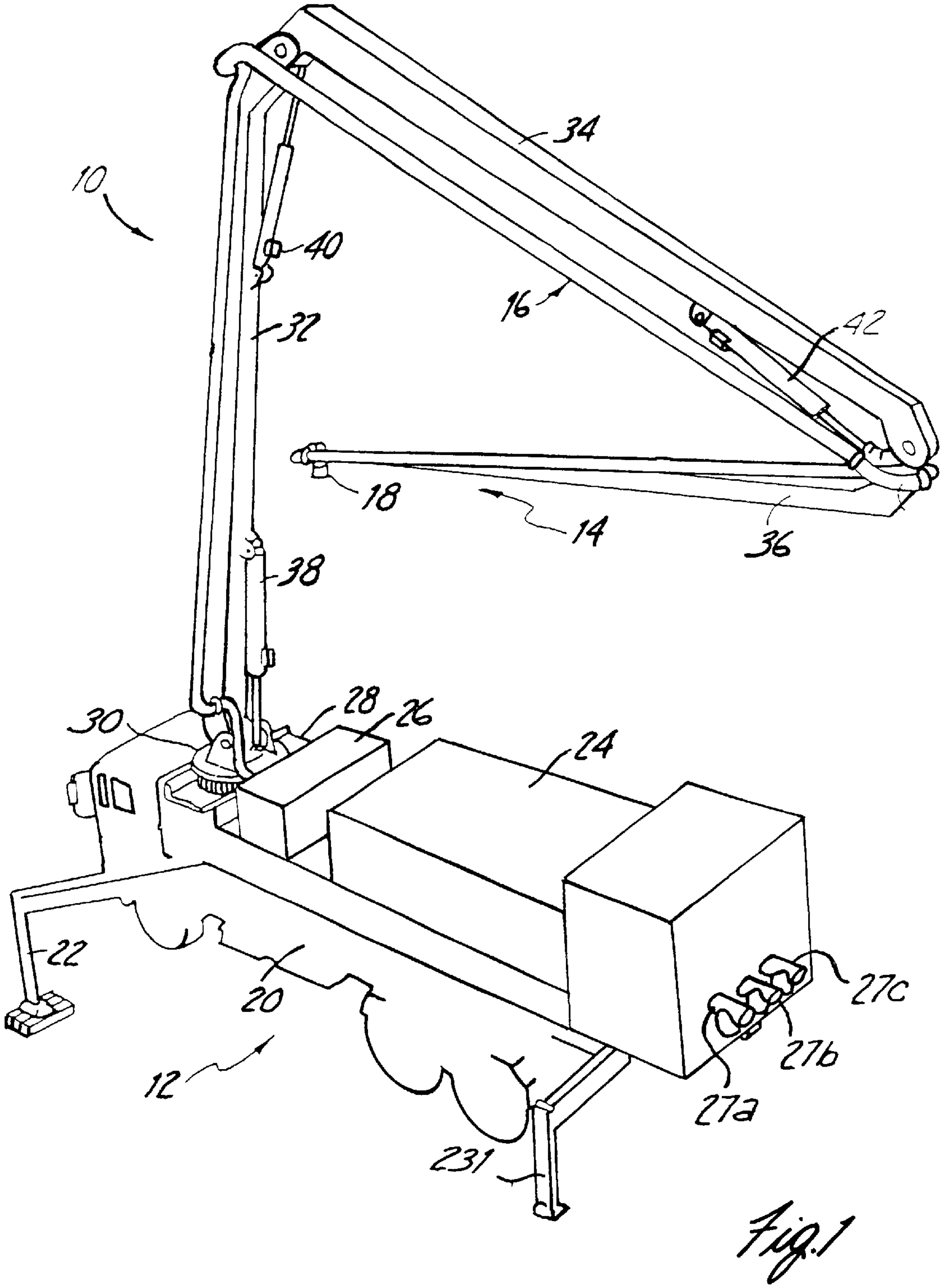
FIG. 1 is a perspective view of a fire-fighting vehicle in accordance with the present invention.

FIG. 1 shows a perspective view of a fire-fighting system 10 according to the present invention. The fire-fighting system 10 includes a truck 12, a boom 14, a conveying pipeline 16, and a nozzle 18. The truck 12 acts as a support or a base for the boom 14. The boom 14 supports and articulates the conveying pipeline 16. The truck 12 provides the ability for the fire-fighting system 10 to be mobile and transported to a location near the vicinity of the fire. The boom 14 and the conveying pipeline 16 function to allow the dispensing point of a quenching agent (such as water or a fire retardant chemical foam) to be located near the fire source. The quenching agent is dispensed through the nozzle 18, which is mounted at the outermost end of the boom 14. Although the preferred embodiment, as shown in FIG. 1, shows the fire-fighting system 10 having a boom 14 and conveying pipeline 16 mounted on the truck 12, in other embodiments the boom 14 and conveying pipeline 16 may be mounted on a stationary support structure.

Figure 3:
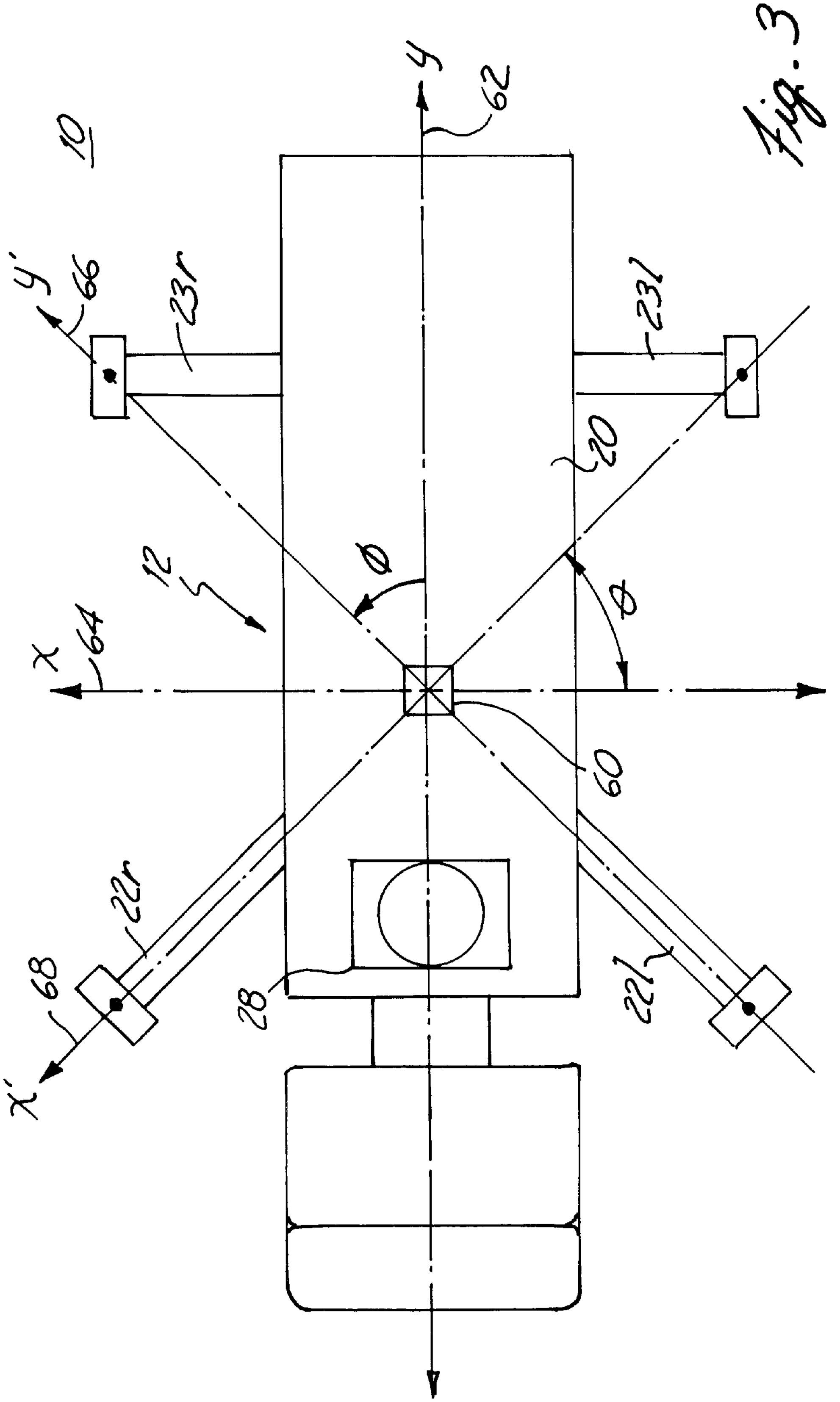
FIG. 3 is a top plan view of the fire-fighting vehicle as shown in FIG. 1.

The truck 12, as best shown in FIGS. 1 and 3, includes a chassis 20, front outriggers **22*l*, 22*r*, rear outriggers 23*l*, 23*r*, a tank 24, a pump 26, and a boom base 28. The chassis 20 of the truck 12 provides the main structural support for supporting the boom 14 and the conveying pipeline 16. The front outriggers 22*l*, 22*r* and rear outriggers 23*l*, 23*r* extend laterally from the chassis 20 and impose a downward force on the surrounding ground. The front outriggers 22*l*, 22*r* and rear outriggers 23*l*, 23*r* function to stabilize the truck 12 and prevent it from tipping during deployment of the boom 14 and conveying pipeline 16. The tank 24 holds a supply of the quenching agent used to suppress or quench the fire. The quenching agent may also be supplied by a source external to the truck 12. The pump 26 acts to move quenching agent from the tank 24 or external source through the conveying pipeline 16 and out the nozzle 18. The base 28 provides a surface for mounting the boom 14. The boom 14 includes a turret 30, a first boom section 32, a second boom section 34, a third boom section 36, a first actuator assembly 38, a second actuator assembly 40, and a third actuator assembly 42**.

The turret 30 of the boom 14 is mounted to the base 28 of the truck 12. The turret 30 allows rotatable motion, about a vertical axis, of the boom 14 with respect to the truck 12. As shown in FIG. 1, a proximal end of the first boom section 32 is pivotally coupled to the turret 30. A distal end of the first boom section 32 is pivotally connected to a proximal end of the second boom section 34. A distal end of the second boom section 34 is pivotally connected to a proximal end of the third boom section 36. Although the preferred embodiment shown in FIG. 1 includes three boom sections, the boom 14 could include any number of boom sections.

As further shown in FIG. 1, the first actuator assembly 38 is connected between the turret 30 and the first boom section 32. The first actuator assembly 38 extends or retracts to control the angular position of the first boom section 32 with respect to the truck 12. The second actuator assembly 40 is coupled between the first boom section 32 and the second boom section 34 and controls the angular position of the second boom section 34 with respect to the first boom section 32. The third actuator assembly 42 is coupled between the second boom section 34 and the third boom section 36 and controls the angular position of the third boom section 36 with respect to the second boom section 34. An operator of the fire-fighting system 10 can control the position of the distal end of the third boom section 36 by controlling the position of the turret 30, the first actuator assembly 38, the second actuator assembly 40, and the third actuator assembly 42. The position of the distal end of the third boom section 36, which is where the nozzle 18 is located, determines the dispensing point of the quenching agent.

The fire-fighting system 10 of the present invention allows an operator to manipulate the actuators 38, 40, 42 and strategically position the nozzle 18 for maximum fire-fighting efficacy. To safely deploy and position the nozzle 18 by manipulating the boom sections 32, 34, 36 with respect to one another, it is important that the boom base 28, supporting the turret 30, is approximately gravitationally level. The boom base 28 must be within three degrees offset from gravitational level along any axis through a center point. If the boom base 28 (which supports the boom 14 and the conveying pipeline 16) is not gravitationally level, it may result in unsafe operating conditions. For example, the boom 14 may experience unintended slewin (i.e., rotation about a vertical axis) at the turret 30. Also, a gravitationally level boom base 28 is important to prevent tipping of the truck 12.

Figure 2:
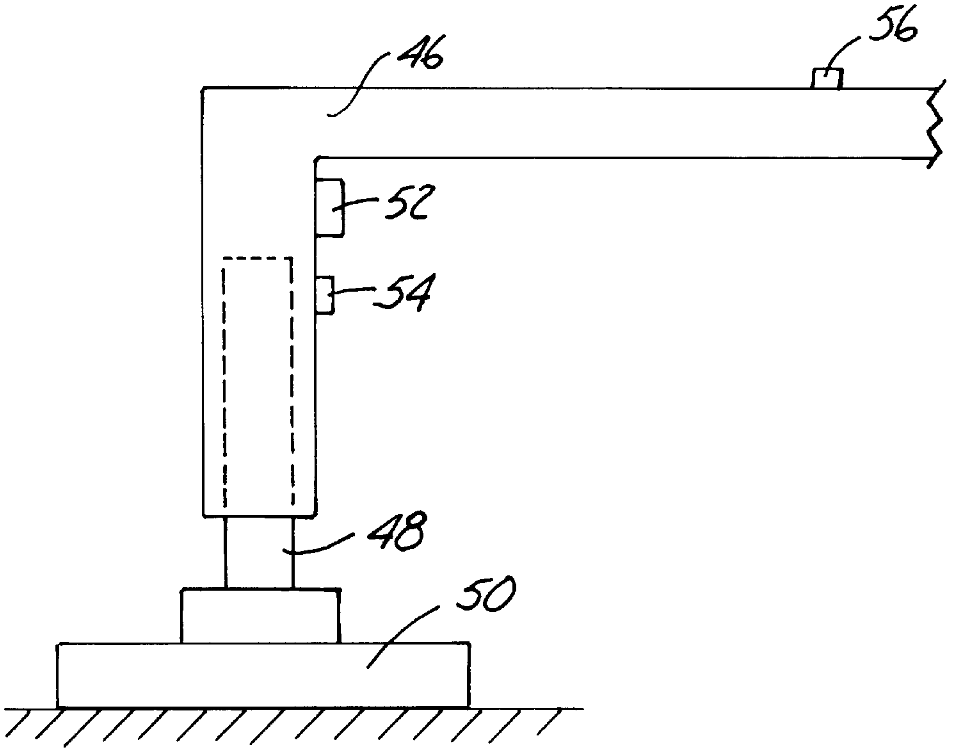
FIG. 2 is a perspective view of one of the outriggers according to the present invention.

Leveling of the truck chassis 20 and the boom base 28 is performed using the front outriggers **22*l*, 22*r* and the rear outriggers 23*l*, 23*r*. As shown in FIG. 2. the outriggers 22*l*, 22*r*, 23*l*, 23*r* include a support arm 46, a foot 48, cribbing 50, solenoid 52, pressure switch 54, and extend sensor 56. Once the truck 12 has reached its intended operating position, the outriggers 22*l*, 22*r*, 23*l*, 23*r* are deployed (i.e., extended out and away from truck) by moving the support arm 46 to place them into position to help level and stabilize the truck 12. The extend sensor 56 is a proximity sensor that provides a signal when the outrigger 22*l*, 22*r*, 23*l*, 23*r* is fully extended away from the truck 12. The outriggers 22*l*, 22*r*, 23*l*, 23*r* apply pressure to the surrounding ground by lowering the foot 48 down onto the cribbing 50, which is placed on the ground under the extension foot 48** for additional support.

The raising and lowering of the foot 48 is done hydraulically using a system generally known to those of ordinary skill in the art. Although in FIG. 2, the solenoid 52 is shown located on the outrigger **22*l*, 22*r*, 23*l*, 23*r*, it may also be located on the truck 12 near the corresponding outrigger 22*l*, 22*r*, 23*l*, 23*r*. The solenoid 52 receives an electrical control signal and acts to open or close a hydraulic fluid valve, which controls the flow of fluid to a hydraulic cylinder, and thereby adjusts the vertical position of the foot 48 with respect to the support arm 46. The pressure switch 54 provides a signal when it detects some threshold pressure level upon the arm 48. The purpose of the pressure switch 54 is to provide a signal when the arm 48 is sufficiently lowered to generate the minimum pressure required upon the cribbing 50 for safe operation on the ground. This minimum pressure is generally around 500 pounds per square inch and functions to evenly distribute the weight between the four outriggers 22*l*, 22*r*, 23*l*, 23*r***.

FIG. 3 shows a top view of the fire-fighting system 10 according to the present invention. FIG. 3 also shows the positions of the front outriggers **22*l*, 22*r* and the rear outriggers 23*l*, 23*r* with respect to the truck 12, when the outriggers 22*l*, 22*r*, 23*l*, 23*r* have been fully deployed. The fire-fighting system 10 of the present invention operates to automatically level the chassis 20 of the truck 12. Leveling of the chassis 20 also levels the base 28, which is attached to the chassis 20. Leveling of the base 28 acts to level the turret 30 and thus the entire boom 14 that it supports. As previously mentioned, leveling of the chassis 20 of the truck 12 is performed by using the outriggers 22*l*, 22*r*, 23*l*, 23*r*** to apply pressure to the surrounding ground.

As shown in FIG. 3, the truck 12 has a tilt sensor 60 mounted to its chassis 20 near a longitudinal center line and closer to a front end of the truck 12. The tilt sensor 60 is centered at the intersection of the imaginary line extending from the front outrigger **22*r* to the rear outrigger 23*l* and the imaginary line extending from the front outrigger 22*l* to the rear outrigger 23*r*. As shown in FIG. 3, a y-axis 62 runs along a longitudinal centerline of the truck 12 of the fire-fighting system 10, and an x-axis 64 runs orthogonal to the y-axis and through a center of the tilt sensor 60. The tilt sensor 60 is disposed at the intersection of the y-axis 62 and the x-axis 64 and oriented such that it may provide a signal representing the angle between the y-axis 62 and gravitational level and the angle between the x-axis 64** and gravitational level.

As further shown in FIG. 3, a y'-axis 66 extends between a center of the foot 48 of the front outrigger **22*l* and a center of the foot 48 of the rear outrigger 23*r*. An x'-axis 68 extends between a center of the foot 48 of the front outrigger 22*r* and a center of the foot 48 of the rear outrigger 23*l*. Both the y'-axis 66 and the x'-axis 68 extend through the intersection of the y-axis 62 and the x-axis 64. Using standard trigonometric relationships, and the signals from the tilt sensor 60, it is thus possible to calculate the angles of the y'-axis 66 and the x'-axis 68 from gravitational level. These signals are then used to calculate which of the outriggers 22*l*, 22*r*, 23*l*, 23*r*** to adjust as explained in greater detail below.

Figure 4:
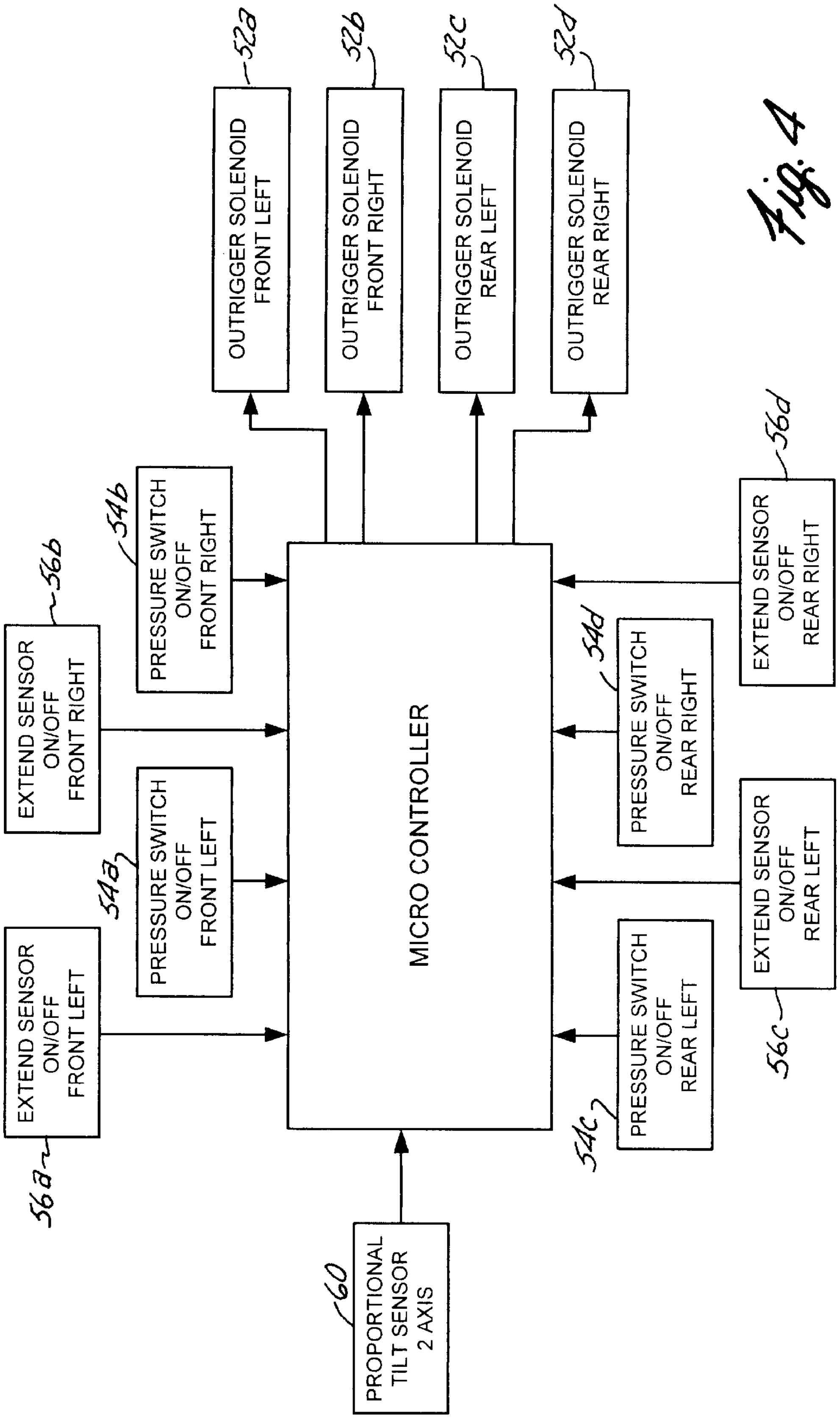
FIG. 4 is a block schematic of the components of the auto leveling system of the present invention.

FIG. 4 shows a block schematic of the inputs and outputs from a microcontroller 70 used to perform the autoleveling function in the fire-fighting system 10 of the present invention. As shown in FIG. 4, the microcontroller 70 accepts input signals from the tilt sensor 60, extend sensor signals **56*a*, 56*b*, 56*c*, and 56*d* (corresponding to the front left outrigger 22*l*, the front right outrigger 22*r*, the rear left outrigger 23*l*, and the rear right outrigger 23*r*, respectively), and pressure switch signals 54*a*, 54*b*, 54*c*, and 54*d* (corresponding to the front left outrigger 22*l*, the front right outrigger 22*r*, the rear left outrigger 23*l*, and the rear right outrigger 23*r*, respectively). Based on these input signals, the microcontroller 70 generates a drive signal to each of the outriggers 22*l*, 22*r*, 23*l*, 23*r*. The drive signal (generated by the microcontroller 70 is an electrical control signal used to operate the solenoids 52 on the outriggers 22*l*, 22*r*, 23*l*, 23*r*, which adjust hydraulic valves to affect the position of the feet 48** of the respective outriggers.

During operation the truck 12 is transported to a strategic position for fighting a fire. The operator then manually deploys the outriggers **22*l*, 22*r*, 23*l*, 23*r*. The operator then commands the two front outriggers 22*l*, 22*r* and the two rear outriggers 23*l*, 2*r* to deploy or extend away from the chassis 20. The outriggers 22*l*, 22*r*, 23*l*, 23*r* continue to deploy until a signal is received from the corresponding extend sensors 56*a*, 56*b*, 56*c*, 56*d*. The operator continues to deploy the outriggers 22*l*, 22*r*, 23*l*, 23*r* until the signal is received from the extend sensor 56*a*, 56*b*, 56*c*, 56*d*, deployment of the corresponding outrigger ceases. Once all four outriggers 22*l*, 22*r*, 23*l*, 23*r* have been fully deployed, the operator selects the autoleveling function. The microcontroller 70 operates the solenoids 52 of each of the outriggers 22*l*, 22*r*, 23*l*, 23*r* to begin extension (i.e., movement down and away from the support arm 56) of the foot 48. This extension continues until a programmed pressure level is reached within the hydraulic fluid driving the foot 48 of the outrigger 22*l*, 22*r*, 23*l*, 23*r*. When the pressure level is reached the pressure switch 54*a*, 54*b*, 54*c*, 54*d* activate and the microcontroller 70 ceases extension of the foot 48 of the corresponding outrigger 22*l*, 22*r*, 23*l*, 23*r*. This process continues until each foot 48 of each outrigger 22*l*, 22*r*, 23*l*, 23*r* is extended to a minimum pressure point. At this point the microcontroller 70** executes the autoleveling routine described below.

As discussed above, and as illustrated in FIG. 3, the outriggers **22*l*, 22*r*, 23*l*, 23*r* are positioned on the y'-axis 66 and the x'-axis 68. The tilt sensor 60, however, provides a signal indicative of the angle with respect to gravitational level of the y-axis 62 and the x-axis 64. Based on the angle provided by the tilt sensor 60, in the form of a voltage, the microcontroller 70 calculates the slope of the chassis 20. The tilt sensor 60 provides two voltages, one indicative of the slope of the y-axis 62 and the other indicative of the slope of the x-axis 64. If the voltage provided by the tilt sensor 60 is positive, the slope is positive. A positive slope along the y-axis 62 is defined by a point on the rear of the truck 12 having a higher altitude than a point on the front of the truck 12. A positive slope along the x-axis 64 is defined by a point on the right side of the truck 12 having a higher altitude than a point on the left side of the truck 12**.

Once the microcontroller 70 has calculated the slope along the y-axis 62 and the slope along the x-axis 64, it calculates the slope along the y'-axis 66 and along the x'-axis 68 by performing a coordinate transformation using the following equations:

$$m'_x=m_x \cos\theta+m_y \sin\theta m'_y=m_y \cos\phi-m_x \sin\phi$$

where $m'_x$ is the slope along the x'-axis 68, and $m'_y$ is the slope along the y'-axis 66, $m_x$ is the slope along the x-axis 64, $m_y$ is the slope along the y-axis 62, θ is the angle between the x-axis 64 and the x'-axis 68 (as shown in FIG. 3), and ϕ is the angle between the y-axis 62 and the y'-axis 66 (as shown in FIG. 3).

The microcontroller 70 then generates a drive signal to each of the outriggers **22*l*, 22*r*, 23*l*, 23*r*** based on $m'_x$ and $m'_y$ using the following equations:

$$x1(t)=k(m'_x(t))$$

$$x2(t)=-k(m'_x(t))$$

$$y1(t)=k(m'_y(t))$$

$$y2(t)=-k(m'_y(t))$$

where x1(t) is the drive signal to the solenoid 52 of the outrigger **23*l* as a function of time, x2(t) is the drive signal to the solenoid 52 of the outrigger 22*r* as a function of time, y1(t) is the drive signal to the solenoid 52 of the outrigger 23*r* as a function of time, y2(t) is the drive signal to the solenoid 52 of the outrigger 22*l*** as a function of time, and k is an adjustable constant that affects the response rate of the system.

The autoleveling system of the fire-fighting system 10 of the present invention is designed to operate so that leveling is obtained only by raising the position of one of the outriggers **22*l*, 22*r*, 23*l*, 23*r*. Therefore, if the drive signal calculated using the above equations is negative, it will not be transmitted to the corresponding solenoid 52. Only positive drive signals are sent causing one or more of the solenoids 52 to open and cause extension or lowering of the corresponding arm 46. The microcontroller 70 continues to perform this procedure until the results from the tilt sensor 60 indicate that the chassis 20 of the truck 12 is sufficiently close to gravitationally level, and the pressure switches 54*a*, 54*b*, 54*c*, 54*d*** have activated, at which time the autoleveling function is complete.

The microcontroller 70 will also terminate the autoleveling procedure if the truck 12 enters an unsafe position such that it may tip. Unsafe positions may be programmed into or calculated by the microcontroller 70 for this purpose.

Although the present invention has been described with reference to a fire-fighting vehicle, it should be apparent to one of ordinary skill in the art that the disclosed system would function equally as well to gravitationally level a boom and pipeline system mounted to another type of vehicle or even mounted to a base not intended to be mobile. For instance, the device of the present invention could be applied to a concrete pumping boom truck. The principle of the present invention may be employed to automatically level a boom system to insure its safe operation.

Although the present invention has been described with reference to preferred embodiments, workers skilled in the art will recognize that changes may be made in form and detail without departing from the spirit and scope of the invention.

What is claimed is:

1. An automatic leveling system for a vehicle used to support an articulable boom and pipeline, the automatic leveling system comprising:

four outriggers connected to and extending outward from the vehicle, each outrigger having a foot that is vertically adjustable with respect to the vehicle;

means for individually adjusting a vertical position of the foot of the outrigger;

means for sensing the position of the vehicle with respect to gravitational level along two coplanar intersecting axes and generating corresponding output signals; and a microprocessor for receiving the output signals, for determining based on the output signals a first inclination variable and a second inclination variable, and for generating a drive signal to the means for individually adjusting a vertical position of the foot based on the first and the second inclination variables to level the vehicle, wherein the first and the second inclination variables are determined by slopes of the vehicle with respect to gravitational level in a first dimension and a second dimension respectively, the first dimension being defined by an x'-axis extending between the foot of a right front outrigger and the foot of a left rear outrigger, and the second dimension being defined by a y'-axis extending between the foot of a left front outrigger and the foot of a right rear outrigger.

2. The automatic leveling system of claim 1 wherein the means for sensing the position of the vehicle comprises a tilt sensor disposed such that it generates a first output signal indicative of the position of the vehicle with respect to gravitational level along a longitudinal centerline of the vehicle and a second output signal indicative of the position of the vehicle with respect to gravitational level along an axis perpendicular to the longitudinal centerline of the vehicle.

3. The automatic leveling system of claim 1 wherein the means for sensing the position of the vehicle comprises a tilt sensor located at a point of intersection of x'-axis and y'-axis.

4. The automatic leveling system of claim 1 further including a pressure switch coupled to each of the means for individually adjusting a vertical position of the foot for detecting the pressure applied by each foot, and wherein the drive signal generated by the microprocessor operates the means for individually adjusting the vertical position of the foot until a minimum pressure level is reached causing the pressure switch to activate.

5. The automatic leveling system of claim 1 wherein the microprocessor continues to generate the drive signals to each of the means for individually adjusting a vertical position of the foot until the determination based on output signals received from the means for sensing the position of the vehicle indicates that the vehicle is within about three degrees of gravitational level.

6. The automatic leveling system of claim 1 wherein the drive signal generated by the microprocessor commands the means for individually adjusting a vertical position of the foot only to extend one of the feet of one of the outriggers.

7. The automatic leveling system of claim 1 wherein, upon full extension of any of the feet of the outriggers the microprocessor ceases to generate the drive signal to the means for individually adjusting the vertical position of the foot.

8. The automatic leveling system of claim 1 wherein the microprocessor calculates whether an unsafe condition has occurred based upon the output signals and ceases to generate a drive signal to each of the means for individually adjusting a vertical position of the foot if the unsafe condition has occurred.

9. The automatic leveling system of claim 1 wherein the means for individually adjusting the vertical position of the foot of the outriggers is hydraulic.

10. The automatic leveling system of claim 9 wherein each of the feet has a solenoid for adjusting the hydraulic pressure to the corresponding foot to cause a change in the vertical position of the foot.

11. The automatic leveling system of claim 1 further including four extend sensors coupled to the four outriggers, the four extend sensors generating an extend signal indicative of the position of the corresponding outrigger with respect to the vehicle.

12. The automatic leveling system of claim 1 wherein:

the means for sensing the position of the vehicle and generating corresponding output signals is adapted to generate output signals indicative of the position of the vehicle with respect to gravitational level along two coplanar intersecting axes that are offset by an angle from x'-axis and y'-axis; and the microprocessor determines the first and the second inclination variables of the vertical using coordinate transformation based on trigonometric relationships.

13. The automatic leveling system of claim 1 wherein:

the drive signal to the right front outrigger varies as a function of the first inclination variable and is independent of the second inclination variable;

the drive signal to the left rear outrigger varies as a function of the first inclination variable and is independent of the second inclination variable;

the drive signal to the left front outrigger varies as a function of the second inclination variable and is independent of the first inclination variable; and the drive signal to the right rear outrigger varies as a function of the second inclination variable and independent of the first inclination variable.

14. The automatic leveling system of claim 1 wherein the generated drive signal has a magnitude, the magnitude varying as a function of the inclination variables.

15. The automatic leveling system of claim 14 wherein the magnitude of the drive signal varies in real time as a function of the inclination variables during a leveling process.

16. A method of automatically leveling a vehicle used to support an articulated boom and pipeline using four outriggers, each outrigger having a foot, the method comprising:

extending the four outriggers to a position lateral to the vehicle;

adjusting the foot of each of the four outriggers downward until each foot generates a minimum force on the surrounding ground;

generating two output signals indicative of the position of the vehicle with respect to gravitational level along two coplanar intersecting axes;

determining based on the output signals a first and a second inclination variables, wherein the first and the second inclination variables are determined by slopes of the vehicle with respect to gravitational level in a first dimension and a second dimension respectively, the first dimension being defined by an x'-axis extending between the foot of a right front outrigger and the foot of a left rear outrigger, and the second dimension being defined by a y'-axis extending between the foot of a left front outrigger and the foot of a right rear outrigger; and generating a drive signal based on the first and the second inclination variables for adjusting at least one of the feet of the outriggers downward to move the vehicle toward gravitational level.

17. The method of claim 16 wherein the magnitude of the drive signal is dependent upon a programmable constant.

18. The method of claim 16 wherein the drive signal is generated until the vehicle is positioned within three degrees of gravitational level along the two coplanar orthogonal axis.

19. The method of claim 16 wherein:

the two coplanar intersecting axes include a y-axis extending along longitudinal centerline of the vehicle and an x-axis perpendicular to y-axis; and the first and the second inclination variables of the vehicle are determined using coordinate transformation based on trigonometric relationships.

20. The method of claim 16 wherein:

the drive signal to the right front outrigger varies as a function of the first inclination variable and is independent of the second inclination variable;

the drive signal to the left rear outrigger varies as a function of the first inclination variable and is independent of the second inclination variable;

the drive signal to the left front outrigger varies as a function of the second inclination variable and is independent of the first inclination variable; and the drive signal to the right rear outrigger varies as a function of the second inclination variable and independent of the first inclination variable.

21. The method of claim 16 further comprising:

stopping generating drive signal for individually adjusting the vertical position of a foot of the outriggers upon full extension of the feet.

22. The method of claim 16 wherein the generated drive signal has the magnitude, the magnitude varying as a function of one of the inclination variables.

23. The method of claim 22 wherein the magnitude of the drive signal varies in real time as a function of one of the inclination variables during a leveling process.

24. An automatic leveling system for a pumping truck supporting an articulated boom and pipeline system, the automatic leveling system comprising:

four outriggers connected to and extending outward from the pumping truck, each outrigger having a foot that is vertically adjustable with respect to the pumping truck;

four solenoids for individually adjusting the vertical position of the foot of the outriggers;

a tilt sensor, mounted to the pumping truck, for sensing the position of the pumping truck with respect to gravitational level along two coplanar intersecting axes and generating corresponding first and second output signals; and a microprocessor for receiving the first and second output signals, for determining a first inclination variable and a second inclination variable, and for generating a drive signal to each of the solenoids based on the first and the second inclination variables wherein the first and the second inclination variables are determined by slopes of the pumping truck with respect to gravitational level in a first dimension and a second dimension respectively, the first dimension being defined by an x'-axis extending between the foot of a right front outrigger and the foot of a left rear outrigger, and the second dimension being defined by a y'-axis extending between the foot of a left front outrigger and the foot of a right rear outrigger.

* * * * *